United States Patent
Namiki et al.

(10) Patent No.: US 11,074,718 B2
(45) Date of Patent: Jul. 27, 2021

(54) IMAGE PROCESSING DEVICE

(71) Applicant: FANUC CORPORATION, Yamanashi (JP)

(72) Inventors: Yuta Namiki, Yamanashi (JP); Shoutarou Ogura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 186 days.

(21) Appl. No.: 16/595,079

(22) Filed: Oct. 7, 2019

(65) Prior Publication Data
US 2020/0134865 A1 Apr. 30, 2020

(30) Foreign Application Priority Data
Oct. 31, 2018 (JP) .............................. JP2018-206021

(51) Int. Cl.
*G06T 7/73* (2017.01)
*G06T 7/50* (2017.01)
*G06K 9/62* (2006.01)

(52) U.S. Cl.
CPC .............. *G06T 7/74* (2017.01); *G06K 9/6228* (2013.01); *G06T 7/50* (2017.01)

(58) Field of Classification Search
CPC .... G06T 7/74; G06T 7/50; G06T 7/13; G06T 7/73; G06T 7/0002; G06K 9/6228; G06K 9/4604; G06K 2209/19; G06K 9/6211
See application file for complete search history.

(56) References Cited

U.S. PATENT DOCUMENTS

| 5,638,465 A | * | 6/1997 | Sano | G06K 9/6228 382/159 |
| 7,209,583 B2 | * | 4/2007 | Enokido | B23K 20/004 382/145 |

(Continued)

FOREIGN PATENT DOCUMENTS

| JP | 2006-190201 A | 7/2006 |
| JP | 2013-058162 A | 3/2013 |
| JP | 2017-096749 A | 6/2017 |

OTHER PUBLICATIONS

"Computer Vision," written by David A. Forsyth and Jean Ponce, translated by Tsuyoshi Ohkita, published by Kyoritsu Shuppan Co., Ltd., 2007. 1, Chapter 8 Edge Detection pp. 165-189.

(Continued)

*Primary Examiner* — Aaron W Carter
(74) *Attorney, Agent, or Firm* — Studebaker & Brackett PC

(57) ABSTRACT

An image processing device comprises: a result acquisition unit that acquires one or more of the input images including a target, and acquires a detection result obtained by comparing feature points of standard shape information with input-side feature points extracted from the input image; a frequency calculation unit that acquires multiple detection results in which the standard shape information and the target are placed in different positions and different postures, and calculates frequencies of detection of the input-side feature points in the input image for corresponding ones of the feature points of the standard shape information; and a feature point selection unit that selects a notable feature point from the feature points of the standard shape information on the basis of the frequencies calculated by the frequency calculation unit.

4 Claims, 14 Drawing Sheets

(56) References Cited

U.S. PATENT DOCUMENTS

| | | | | |
|---|---|---|---|---|
| 2002/0015165 | A1* | 2/2002 | Taka | H04N 1/0473 |
| | | | | 358/1.9 |
| 2003/0179921 | A1* | 9/2003 | Sakai | G06T 7/0002 |
| | | | | 382/151 |
| 2005/0167471 | A1* | 8/2005 | Enokido | H01L 24/78 |
| | | | | 228/103 |
| 2009/0141982 | A1* | 6/2009 | Suzuki | G06K 9/00335 |
| | | | | 382/190 |
| 2011/0222766 | A1* | 9/2011 | Kato | G06K 9/481 |
| | | | | 382/168 |
| 2014/0253738 | A1* | 9/2014 | Mullis | H04N 13/257 |
| | | | | 348/187 |
| 2016/0217318 | A1* | 7/2016 | Hayasaka | G06K 9/00288 |
| 2017/0132451 | A1* | 5/2017 | Namiki | G06K 9/6254 |
| 2018/0150974 | A1* | 5/2018 | Abe | G06K 9/6256 |
| 2018/0260628 | A1* | 9/2018 | Namiki | G06N 3/088 |
| 2018/0336407 | A1* | 11/2018 | Namiki | G06N 20/00 |
| 2019/0012579 | A1* | 1/2019 | Namiki | G06T 7/0002 |
| 2019/0077015 | A1* | 3/2019 | Shibasaki | B25J 9/1612 |
| 2019/0096055 | A1* | 3/2019 | Namiki | B25J 9/1664 |
| 2020/0098118 | A1* | 3/2020 | Namiki | G06T 7/75 |
| 2020/0134865 | A1* | 4/2020 | Namiki | G06K 9/4604 |
| 2020/0211221 | A1* | 7/2020 | Yano | G06K 9/4604 |
| 2021/0056659 | A1* | 2/2021 | Ogura | G06K 9/00624 |

OTHER PUBLICATIONS

"Object Recognition from Local Scale-Invariant Features", David G. Lowe, Proc. of the International Conference on Computer Vision, Corfu (Sep. 1999).

An Office Action; "Notice of Reasons for Refusal," mailed by the Japanese Patent Office dated Dec. 1, 2020, which corresponds to Japanese Patent Application No. 2018-206021 and is related to U.S. Appl. No. 16/595,079; with English language translation.

* cited by examiner

IMAGE PROCESSING DEVICE

This application is based on and claims the benefit of priority from Japanese Patent Application No. 2018-206021, filed on 31 Oct. 2018, the content of which is incorporated herein by reference.

BACKGROUND OF THE INVENTION

Field of the Invention

The present invention relates to an image processing device that detects a target from an input image on the basis of standard shape information defined by multiple feature points.

Related Art

According to a technique conventionally employed in a method of detecting an image of particular target from an input image, matching is performed to compare the image of the target and standard shape information (information called a model pattern or a template, for example), thereby detecting the target from the input image. In the matching, the target is determined to be detected if a level of matching of a feature quantity exceeds a designated level (threshold).

In exemplary feature quantity matching, a feature point group defined by multiple feature points is used. Non-patent document 1 describes a method of extracting an edge point from an input image as a feature point forming a model pattern. An edge point is a point where brightness changes largely in an image. Generally, an image of the contour of a target has large brightness gradient. Thus, matching of the contour shape of the target is performed using an edge point as a feature quantity. For example, an edge point group extracted from an image including a target to be detected is stored as a model pattern. The target is detected on the basis of a level of matching between an edge point group extracted from an input image acquired by an image capture device and the edge point group as the model pattern. The technique of this type is known to use the generalized Hough transform. Non-patent document 2 discloses a method of extracting an element forming a model pattern other than an edge point. Non-patent document 2 describes a method of extracting an SIFT feature point from an input image.

A method known to be employed in these types of techniques is to improve determination accuracy by paying attention to a range having a feature in a model pattern. For example, patent document 1 describes an appearance inspection device that sets a first region in such a manner as to surround a criterion pattern in a criterion image and sets a second region for providing a feature to the position and the posture of the criterion pattern in the criterion image. This appearance inspection device searches for a feature extracted from the first region from an inspection target image to obtain the position and the posture of the criterion pattern roughly. Further, the feature extracted from the second region is searched for from the inspection target image to obtain at least one of the position and the posture of the criterion pattern finely.

Patent Document 1: Japanese Unexamined Patent Application, Publication No. 2017-96749
Non-Patent Document 1: "Computer Vision," written by David A. Forsyth and Jean Ponce, translated by Tsuyoshi Ohkita, published by Kyoritsu Shuppan Co., Ltd., 2007. 1
Non-Patent Document 2: "Object Recognition from Local Scale-Invariant Features", David G. Lowe, Proc. of the International Conference on Computer Vision, Corfu (September 1999)

SUMMARY OF THE INVENTION

Not giving consideration to a range having a feature or a feature point group forming a part of a model pattern may result in failure to identify the position of a target in an image correctly. In the case of a target 100 having a key groove shape such as that shown in FIG. 1, for example, the target 100 is circular except a groove 101. This causes a risk that, even in the presence of shift of the position of a region 110 including the groove 101, the target will be detected on the basis of a level of matching of a part other than the groove 101. In the case of a shape with a small circle 201 existing near a long straight line 200 such as that shown in FIG. 2, a risk also occurs that, even if the straight line 200 is shifted in a parallel direction to shift a region 210 including the circle 201, this shifted state will be detected as a target. As described above, there is a risk that, if a target is detected on the basis of a level of matching of a feature quantity outside the particular region 110 or 210, the position or the posture of the target will be detected erroneously. Further, distinction may be required between two types of targets having the same contour such as those shown in FIG. 3. In this case, while a circle 302 is present in a second target 301 and absent from a first target 300, the first target 300 and the second target 301 have the same contour. Hence, a detection result shows a high level of matching between the entire first target 300 and the entire second target 301. This makes it difficult to detect the first target 300 and the second target 301 distinctively without paying attention to the circle 302.

For the reason given above, setting a notable region in a model pattern achieves detection of a target stably. If the notable region is to be selected manually by a human, however, determining the notable region is difficult in a complicated model pattern, while erroneous selection is unlikely to occur if the notable region is clearly shown like in the case of FIG. 1, 2, or 3. Additionally, due to a careless mistake by a human, a region other than a notable region may be selected to reduce detection accuracy. In this regard, while the second region is set as a notable region in patent document 1, an operator selects the shape of the second region (rectangular or circular, for example) in response to operation on a console, and sets the size and the position of the second region in response to further operation on the console. Hence, there is still room for improvement in terms of setting a notable region accurately.

The present invention is intended to provide an image processing device capable of detecting a target of any shape in an image in an accurate position and an accurate posture on the basis of standard shape information.

(1) The present invention relates to an image processing device (image processing device 10 described later, for example) that detects a target (target 100 described later, for example) from an input image (input image 90 described later, for example) on the basis of standard shape information (model pattern 150 described later, for example) defined by multiple feature points (feature points 151, 152 described later, for example), comprising: a result acquisition unit (result acquisition unit 41 described later, for example) that acquires the one or more of the input images including the target, and acquires a detection result obtained by comparing the feature points of the standard shape information with input-side feature points (input-side feature points 120, 121 described later, for example) extracted from the input image; a frequency calculation unit (frequency calculation unit 42 described later, for example) that acquires multiple detection results in which the standard shape information and the target are placed in different positions and different postures, and calculates frequencies of detection of the input-side feature points in the input image for corresponding ones of the feature points of the standard shape information; and a feature point selection unit (feature point selection unit 43 described later, for example) that selects a feature point (feature point 152 described later, for example) as a notable feature point from the feature points of the standard shape information on the basis of the frequencies calculated by the frequency calculation unit.

(2) In the image processing device described in (1), the feature point selection unit preferably selects the feature point from the feature points of the standard shape information as the notable feature point. The selected feature point corresponds to one of the input-side feature points detected at a high frequency in a right detection result indicating that the target has been detected correctly. The one input-side feature point is detected at a low frequency in an erroneous detection result indicating that the target has not been detected correctly.

(3) In the image processing device described in (2), the result acquisition unit preferably acquires a base image used as a basis for generating the standard shape information as the input image, and the feature point selection unit preferably determines a detection result indicating detection of the target in the same position and the same posture as in the base image to be the right detection result, and determines a detection result indicating detection of a different position and a different posture from those of the right detection result to be the erroneous detection result.

(4) Preferably, the image processing device described in (2) further comprises a right/error setting unit (operator's panel 35 described later, for example) that determines whether each of the detection results is the right detection result or the erroneous detection result.

The image processing device of the present invention is capable of detecting a target of any shape in an image in an accurate position and an accurate posture on the basis of standard shape information.

DETAILED DESCRIPTION OF THE INVENTION

Figure 1:
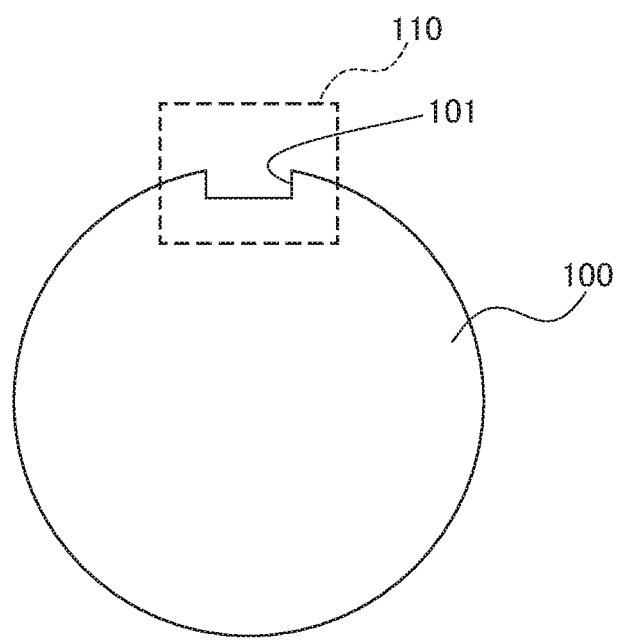
FIG. 1 is a schematic view showing an example where a target detected from an image has a shape of a key groove.

A preferred embodiment of the present invention will be described below by referring to the drawings. An image processing system 1 according an embodiment of the present invention is a system for detecting an image of a target 2 from an input image 5 on the basis of a model pattern 50 representing a feature of the image of the target 2. Two exemplary devices using the image processing system 1 of this embodiment will be described first.

Figure 4:
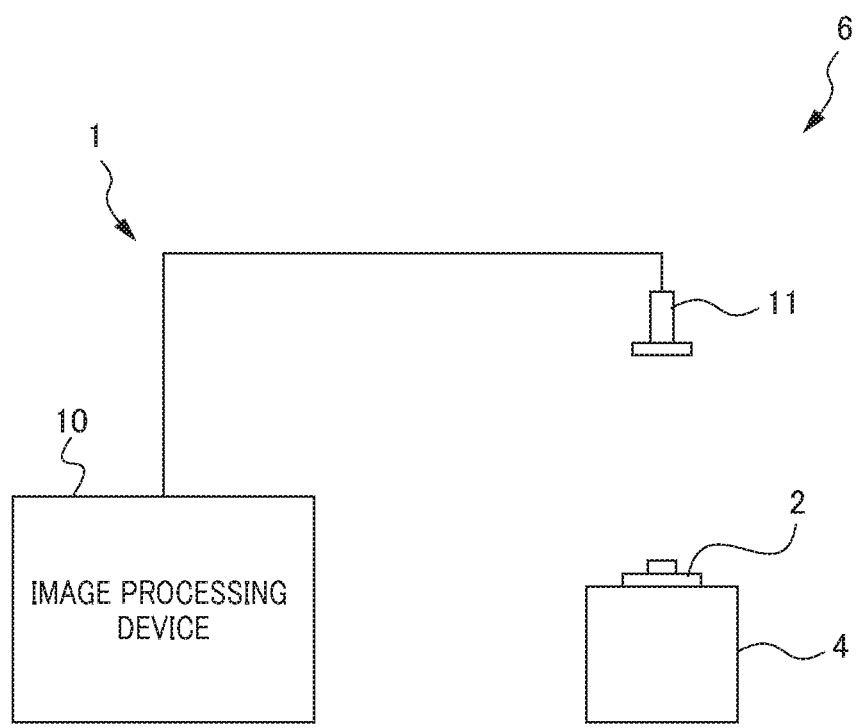
FIG. 4 is a schematic view showing an example of a device using an image processing system of an embodiment and in which the position of a visual sensor is fixed.

FIG. 4 is a schematic view showing an example of a device 6 using the image processing system 1 of this embodiment and in which the position of a visual sensor 11 is fixed. As shown in FIG. 4, the target 2 is placed on a work table 4. The visual sensor 11 is a camera for capturing an image of the target 2. The visual sensor 11 is fixed at a position by support means (not shown) where the visual sensor 11 can capture an image of the target 2. Image information acquired by the visual sensor 11 is transmitted to an image processing device 10. The image processing device 10 performs image processing described later to detect an image of the target 2 on the basis of the input image 5 (see FIG. 5) received from the visual sensor 11.

Figure 5:
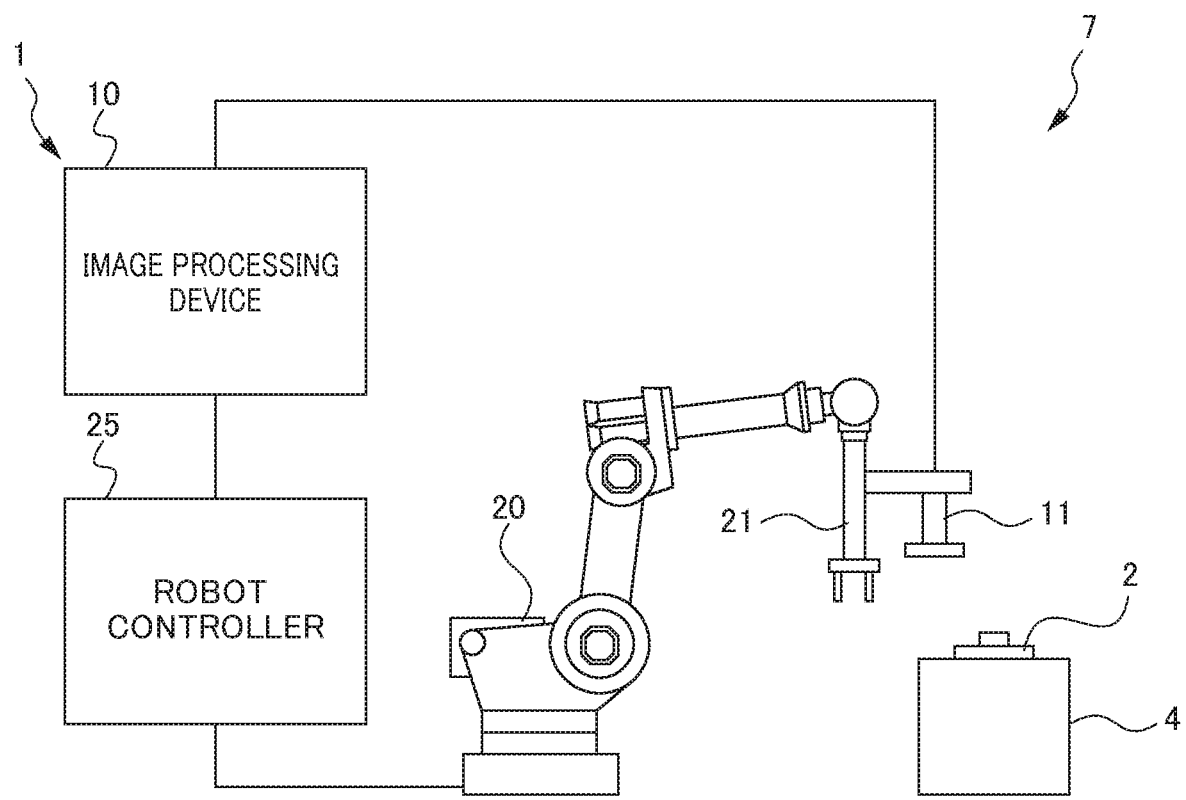
FIG. 5 is a schematic view showing an example of a device using the image processing system of this embodiment and in which the position of the visual sensor is movable.

The example in which the position of the visual sensor 11 is fixed has been described by referring to FIG. 4. In a case described next by referring to FIG. 5, the position of the visual sensor 11 is movable. FIG. 5 is a schematic view showing an example of a device 7 using the image processing system 1 of this embodiment and in which the position of the visual sensor 11 is movable. A structure common or comparable to a structure in the device 6 described by referring to FIG. 4 may be identified by the same sign and may not be described.

FIG. 5 shows an arm-type robot 20 having an end to which a robot hand 21 is attached. The visual sensor 11 of this example is fixed to the robot hand 21 as a terminal of the robot 20. The robot hand 21 is a movable unit to be moved by the robot 20 or by a mechanism in the robot hand 21. This makes the position of the visual sensor 11 also movable. The image processing device 10 responsible for the image processing is configured to be capable of communicating with a robot controller 25 that controls the motion of the robot 20, etc. to allow exchange of information between the image processing device 10 and the robot 20. The image processing device 10 performs the image processing described later to detect an image of the target 2 on the basis of the input image 5 (see FIG. 5) received from the visual sensor 11 while allowing for the movements or states of the robot 20 and the robot hand 21.

Figure 6:
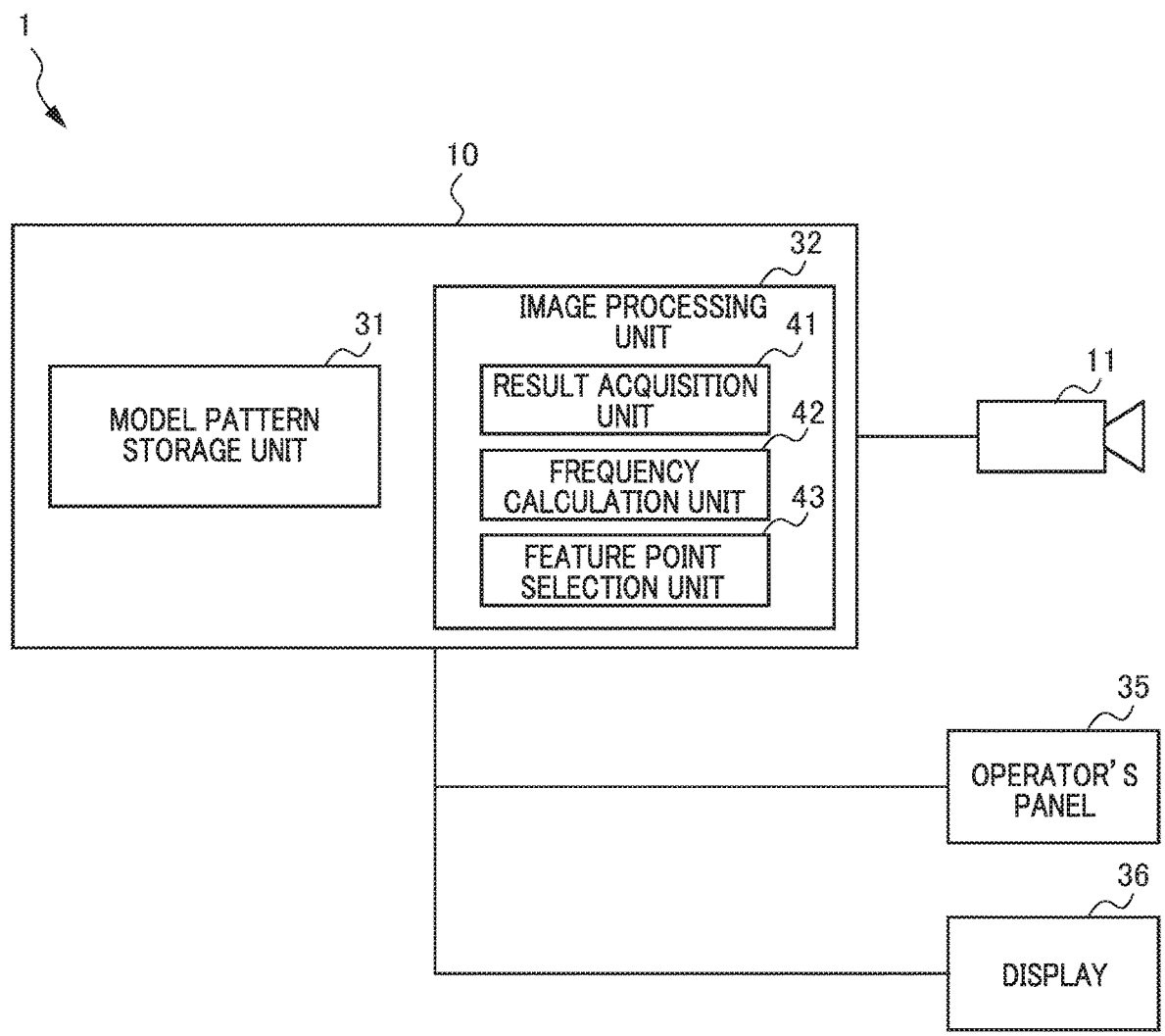
FIG. 6 is a functional block diagram of the image processing system of this embodiment.

As described above, the image processing system 1 of this embodiment is applicable both to the device 6 in which the position of the visual sensor 11 is fixed and the device 7 in which the position of the visual sensor 11 is movable. The image processing by the image processing system 1 will be described next. FIG. 6 is a functional block diagram of the image processing system 1 of this embodiment.

As shown in FIG. 6, the image processing system 1 of this embodiment includes the image processing device 10 as a computer responsible for the image processing, the visual sensor 11 that acquires the input image 5, an operator's panel (operation unit) 35 used by an operator for correction, etc., on the model pattern 50 generated from the input image 5, and a display (output unit) 36 on which image information such as the input image 5 and the model pattern 50 is displayed.

The image processing device 10 is realized by a computer including a CPU, a storage medium storing predetermined software, and others. The image processing device 10 of this embodiment is configured using a model pattern storage unit 31 and an image processing unit 32 responsible for the image processing on the acquired input image 5.

The model pattern storage unit 31 stores the model pattern 50 used for detection process of the image processing. The model pattern 50 is standard shape information defined by a feature point of a target.

The image processing unit 32 performs various types of image processing such as detection of the shape of a target from the input image 5 on the basis of the model pattern 50 stored in the model pattern storage unit 31. The image processing unit 32 of this embodiment includes a result acquisition unit 41, a frequency calculation unit 42, and a feature point selection unit 43. The functions of the result acquisition unit 41, the frequency calculation unit 42, and the feature point selection unit 43 will be described later.

Figure 7:
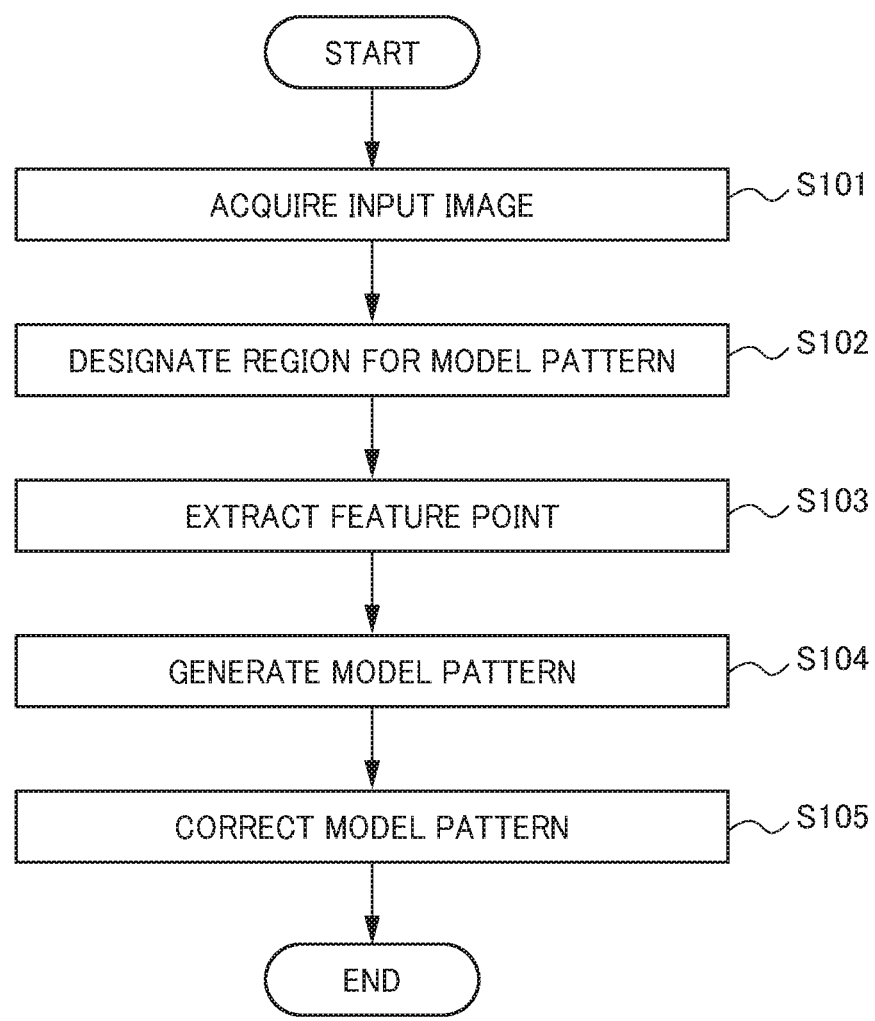
FIG. 7 is a flowchart showing a procedure of generating a model pattern.
Figure 8:
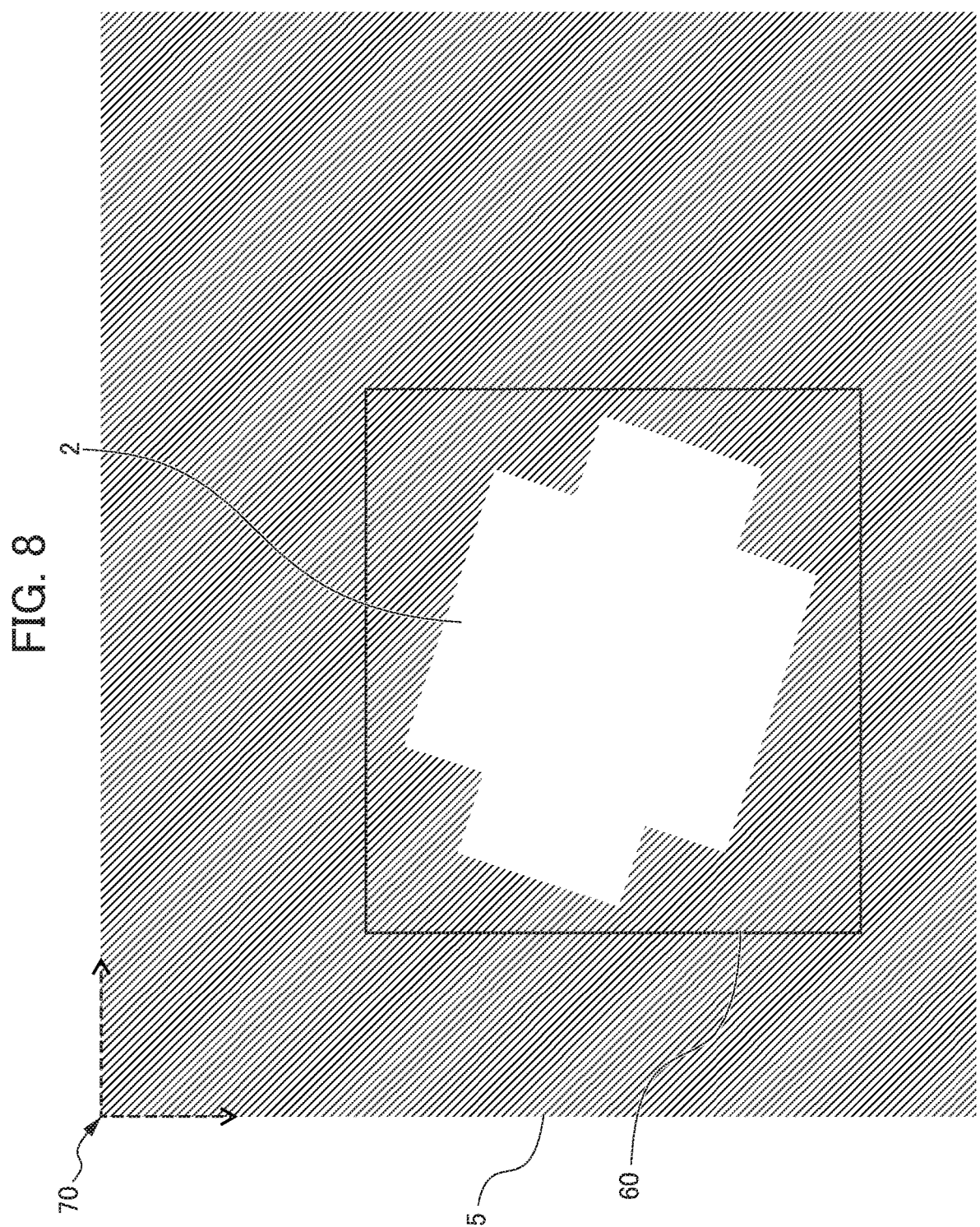
FIG. 8 shows a model pattern designation region designated in an image.
Figure 9:
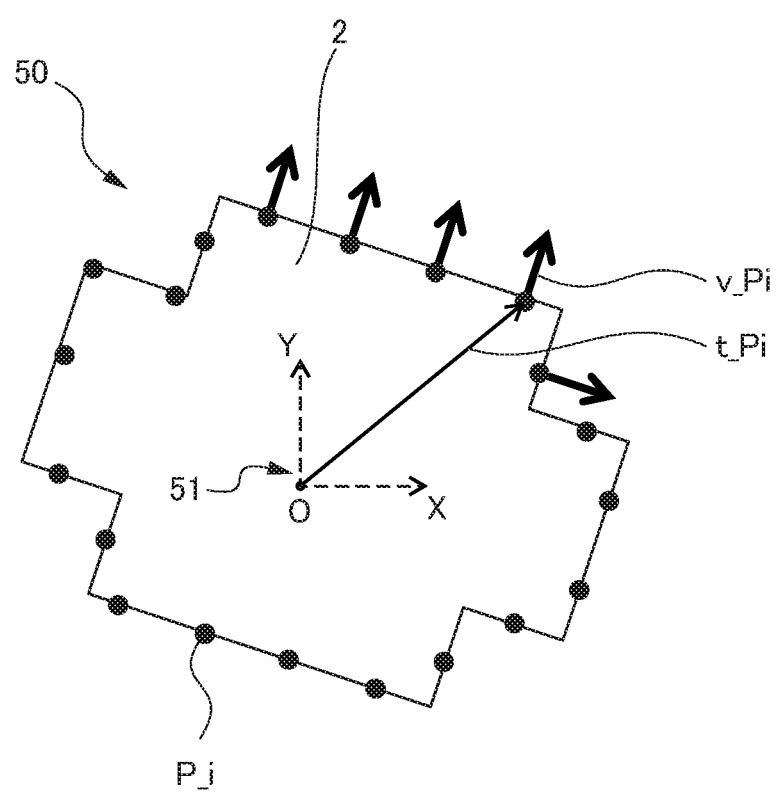
FIG. 9 shows a model pattern including multiple feature points.

An example of generation of the model pattern 50 will be described next. FIG. 7 is a flowchart showing a procedure of generating the model pattern 50. FIG. 8 shows the model pattern designation region 60 designated in an image. FIG. 9 shows the model pattern 50 defined by multiple feature points P_i.

As shown in FIG. 7, the target 2 intended to be taught as the model pattern 50 is placed within the view of the visual sensor 11 and an image of the target 2 is captured, thereby acquiring the input image 5 including the target 2 (step S101). At this time, the position of the visual sensor 11 and that of the target 2 relative to each other are preferably determined to be the same position of the visual sensor 11 and that of the target 2 at which the target 2 is to be detected during actual use.

A region in the captured image where the target 2 appears is designated as a region for the model pattern 50 (step S102). This region designated in step S102 will be called the model pattern designation region 60. The model pattern designation region 60 of this embodiment is designated as a rectangular region or a circular region so as to surround the target 2.

Next, a feature point is extracted (step S103). The feature point is to form the model pattern 50. Multiple feature points P_i (i=1 to NP) are extracted from the model pattern designation region 60. The feature point P_i can be extracted by various methods. In this embodiment, an edge point having large brightness gradient in an image and available for acquiring the contour shape of a target is used as the feature point P_i. The edge point may be extracted using a Sobel filter or a Canny edge detector.

The physical quantity of an edge point includes the position of the edge point, and the direction of brightness gradient and the dimension of the brightness gradient at the edge point, etc. With the direction of the brightness gradient at the edge point defined as the posture of a feature point, the posture of the feature point can be defined in addition to the position of the feature point. The physical quantity of the edge point, specifically, the position and the posture (direction of brightness gradient) of the edge point, and the dimension of the brightness gradient at the edge point, is stored as the physical quantity of the feature point.

A model pattern coordinate system 51 is defined. On the basis of the model pattern coordinate system 51 and an origin O, the feature point P_i is expressed in terms of a posture vector v_Pi, a position vector t_Pi, etc. of the feature point P_i. For example, the center of gravity of each feature point P_i forming the model pattern 50 is defined as the origin O in the model pattern coordinate system 51. The origin O can be defined by an appropriate method such as selecting any one point from the feature points P_i. Using the model pattern coordinate system 51 is also an exemplary method. A different method may be employed for expressing the position and the posture of the feature point P_i. Regarding the axis direction of the model pattern coordinate system 51 (posture), any two points may be selected from the feature points P_i forming the model pattern 50, a direction from one of these two points toward the other may be defined as an X-axis direction, and a direction orthogonal to the X-axis direction may be defined as a Y-axis direction, for example. The axis direction can also be defined in such a manner that an image coordinate system and the model pattern coordinate system 51 become parallel to each other in an image used for generating the model pattern 50. In this way, the setting of the model pattern coordinate system 51 and the origin O can be changed appropriately according to the situation.

Next, on the basis of the physical quantity of the extracted feature point P_i, the model pattern 50 is generated (step S104). The physical quantity of the extracted feature point P_i is stored into the model pattern storage unit 31 as the feature point P_i forming the model pattern 50. In this embodiment, the model pattern coordinate system 51 is defined within the model pattern designation region 60. The position and the posture of the feature point P_i are stored as values expressed in the model pattern coordinate system 51 (see FIG. 9) resulting from values expressed in an image coordinate system 70 (see FIG. 8).

If the model pattern 50 is required to be corrected, the model pattern 50 is corrected (step S105). The correction on the model pattern 50 in step S105 is made by an operator or by the image processing unit 32. Operator generated information resulting from the correction by the operator may be acquired as correction information and may be used for machine learning, etc.

As a result of a series of the foregoing processes, the model pattern 50 is generated. A method of setting a notable feature point will be described next.

Figure 10:
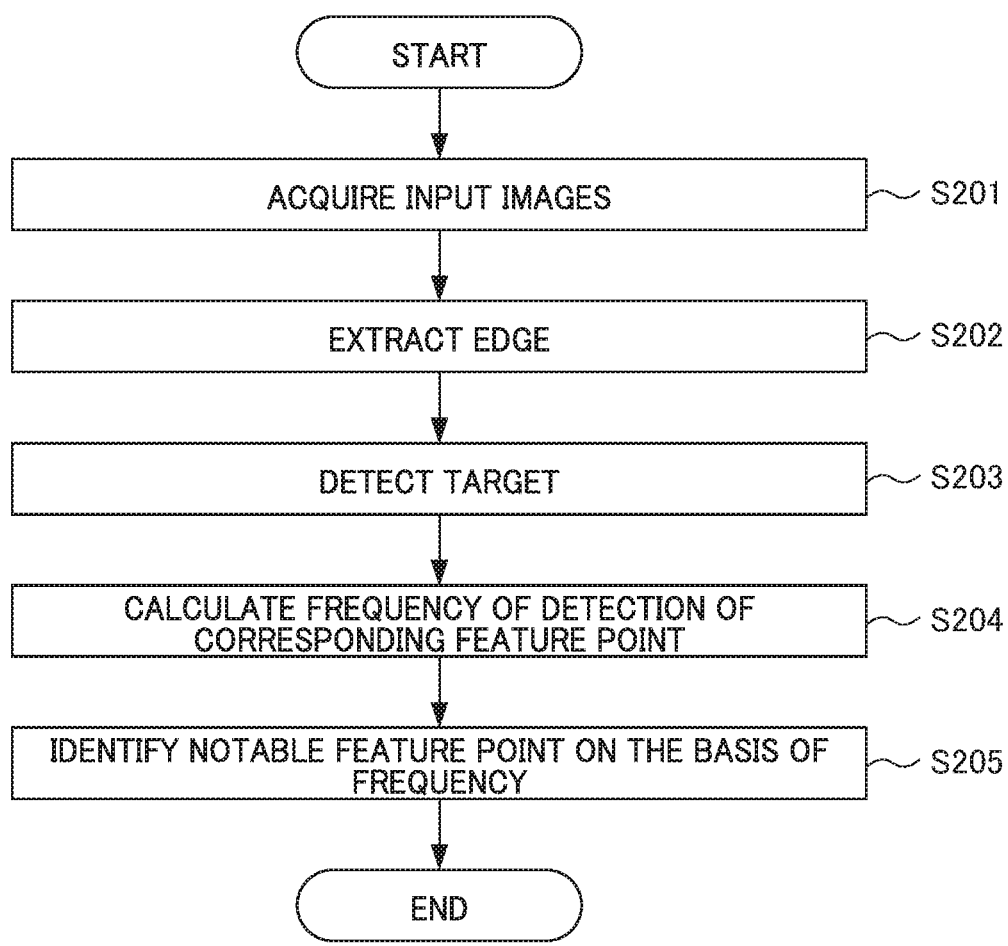
FIG. 10 is a flowchart showing a procedure of setting a notable range in a model pattern according to this embodiment.
Figure 11:
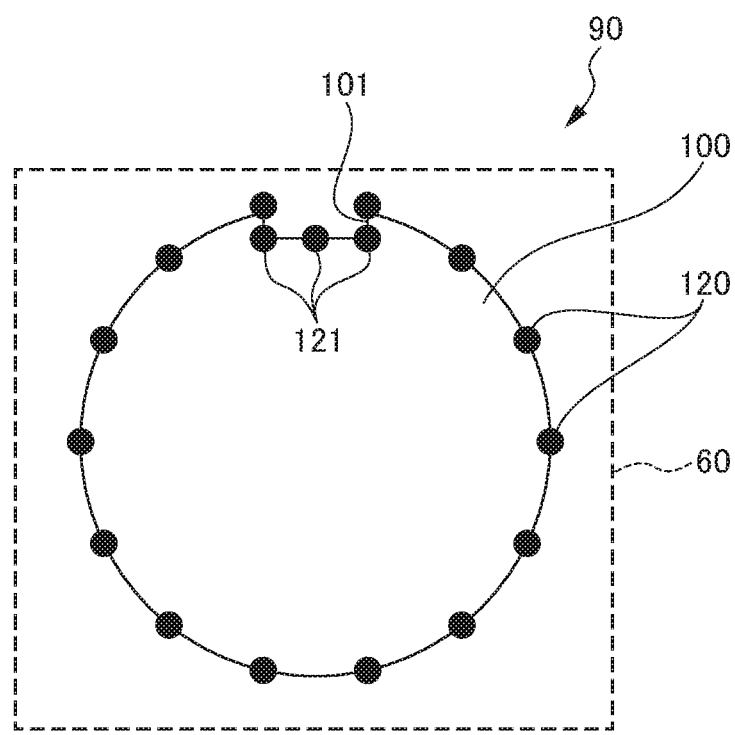
FIG. 11 is a schematic view showing an input image used for detecting a target of a key groove shape as a detection target.

In the following, selection of a notable feature point will be described using the target 100 shown in FIG. 1 as an example. FIG. 10 is a flowchart showing a procedure of setting a notable range in a model pattern 150. FIG. 11 is a schematic view showing an input image used for detecting the target 100 of a key groove shape as a detection target.

Figure 12:
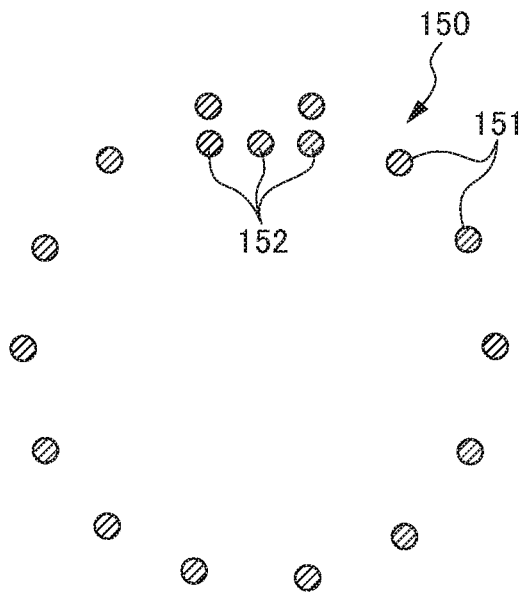
FIG. 12 is a schematic view showing a model pattern generated from the target of the key groove shape.

FIG. 12 is a schematic view showing the model pattern 150 generated from the target 100 of the key groove shape.

As shown in FIG. 11, the result acquisition unit 41 of the image processing unit 32 acquires an input image including the target 100 of the key groove shape (step S201). The input image acquired in step S201 of this embodiment is an image having been used for generating the model pattern 150.

The result acquisition unit 41 sets the model pattern designation region 60, and extracts an edge inside the model pattern designation region 60 (step S202). The model pattern designation region 60 is a region of an appropriate shape such as a rectangle or a circle, for example, for designating a predetermined range. As shown in FIG. 11, as a result of the edge extraction process, an input-side feature point 120 in a circumferential direction and an input-side feature point 121 at a groove part are extracted. Like in the foregoing case, this extraction of the feature points is described as an example.

After implementation of the edge extraction process in step S202, the target 100 is detected using the model pattern 150 shown in FIG. 12 (step S203). As described above, the model pattern 150 used in this step is a pattern generated from an input image. The model pattern 150 is generated by the same method as the foregoing method described by referring to FIGS. 7 to 9. As shown in FIG. 12, the model pattern 150 corresponding to the target 100 includes a feature point 151 in a circumferential direction and a feature point 152 at a groove part.

Figure 13A:
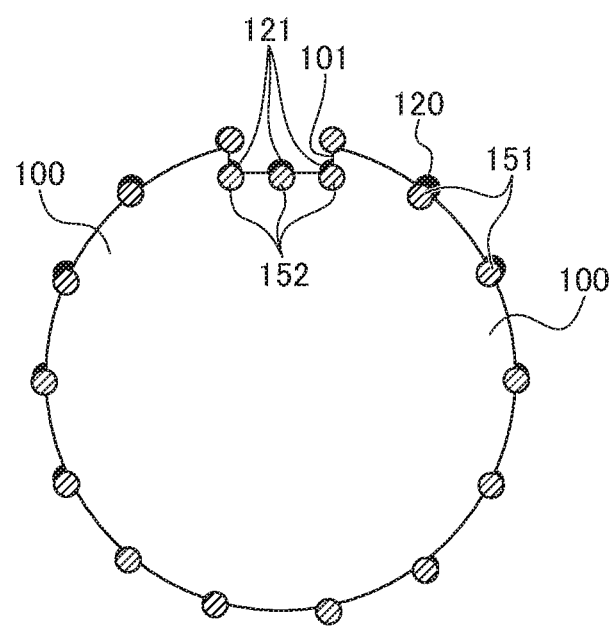
FIG. 13A is a schematic view showing a correct detection result indicating that a model pattern and the target match each other in their positions and postures.
Figure 13B:
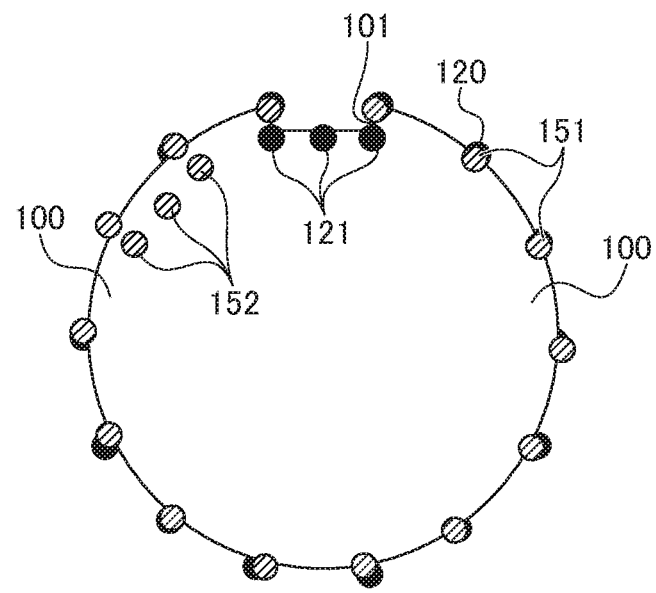
FIG. 13B is a schematic view showing an example of an incorrect detection result indicating that the model pattern and the target do not match each other in their postures.
Figure 13C:
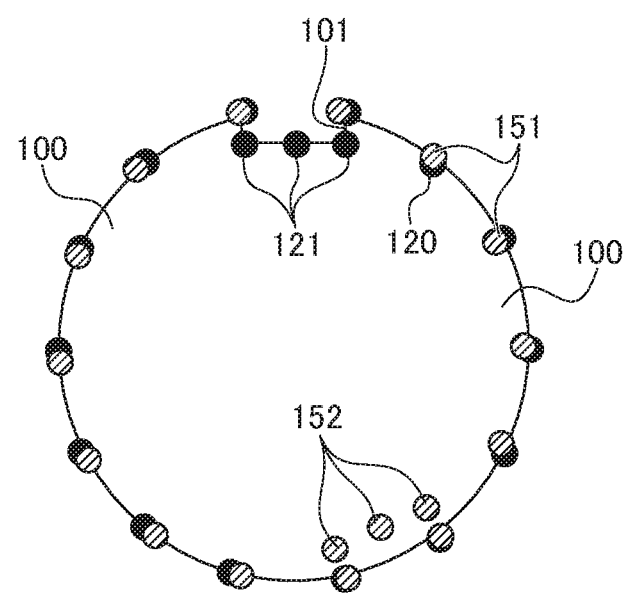
FIG. 13C is a schematic view showing an example of an incorrect detection result indicating that the model pattern and the target do not match each other in their postures.

The process of detecting the target 100 in step S203 will be described by referring to FIGS. 13A to 13C. FIG. 13A is a schematic view showing a correct detection result (right detection result) indicating that the model pattern 150 and the target 100 match each other in their positions and postures. FIGS. 13B and 13C are schematic views each showing an example of an incorrect detection result (erroneous detection result) indicating that the model pattern 150 and the target 100 do not match each other in their postures.

In the process of detecting the target 100, searching process is performed for matching the model pattern 150 and the target 100 in their positions and postures. In this searching process, the model pattern 150 is translated or rotated. While the positions of the model pattern 150 and the target 100 match each other in all the examples shown in FIGS. 13A to 13C, the posture of the model pattern 150 differs between these examples.

In the correct detection result shown in FIG. 13A, the input-side feature points 120 and 121 extracted from the target 100 match the feature points 151 and 152 of the model pattern 150 respectively. By contrast, in each of FIGS. 13B and 13C, while the feature point 151 of the model pattern 150 in the circumferential direction overlaps the input-side feature point 120 of the target 100 in the circumferential direction, the feature point 152 at the groove part does not match the input-side feature point 121 of the target 100 at the groove part. More specifically, in the state shown in FIG. 13B, the feature point 152 of the model pattern 150 at the groove part is shifted slightly in the anticlockwise direction from the input-side feature point 121 of the target 100 at the groove part. In the state shown in FIG. 13C, the feature point 152 of the model pattern 150 at the groove part is shifted largely in the clockwise direction from the input-side feature point 121 of the target 100 at the groove part.

Postures taken in the searching process are not limited to those shown in FIGS. 13A to 13C. The feature points 151 and 152 of the model pattern 150 and the input-side feature points 120 and 121 of the target 100 are respectively compared with each other several times at different postures. Each comparison result indicating the presence or absence of match between the input-side feature points 120 and 121 of the target 100 and the feature points 151 and 152 of the model pattern 150 respectively is stored into the model pattern storage unit 31. For example, in the case of FIG. 13A, the feature point 152 at the groove part is determined to be in a matching state. In each of the cases of FIGS. 13B and 13C, the feature point 152 at the groove part is determined not to be in a matching state. The match mentioned herein includes complete match and additionally, partial match.

After implementation of the process of detecting the target 100, the frequency calculation unit 42 of the image processing unit 32 calculates a frequency of detection of a corresponding feature point (step S204). The frequency calculation unit 42 checks each detection result to determine the presence of the input-side feature points 120 and 121 in the input image corresponding to the feature points 151 and 152 of the model pattern 150 respectively, and calculates a frequency of detection of a corresponding feature point in the input image for each of the feature points 151 and 152 of the model pattern 150.

As described above, as a result of the detection process performed several times, the feature points 151 and 152 of the model pattern 150 are brought to matching states at different frequencies. In the example mentioned herein in which the model pattern 150 is rotated in each predetermined posture in a position corresponding to the target 100, the feature point 152 at the groove part is brought to a matching state only in a correct position or in the vicinity of the correct position. By contrast, even if the feature point 152 at the groove part does not match the groove 101 of the target 100, the feature point 151 in the circumferential direction is still determined to be in a matching state. In this way, a large difference in a frequency of matching the target 100 is generated between the feature point 152 at the groove part and the feature point 151 other than the feature point 152.

After implementation of the process in step S204, the feature point selection unit 43 of the image processing unit 32 performs process of identifying a notable feature point on the basis of frequencies of match between the feature points 151 and 152 of the model pattern 150 and the input-side feature points 120 and 121 of the target 100 respectively. In this embodiment, a notable feature point is identified by giving consideration to the correct detection result (see FIG. 13A) and the incorrect detection results (see FIGS. 13B and 13C).

In this embodiment, whether a detection result is correct or incorrect is determined on the basis of a position and a posture set as the model pattern 150. More specifically, a detection result belonging to multiple detection results and matching a position and a posture of the model pattern 150 in an input image used as a basis for generating the model pattern 150 is determined to be a correct detection result. The other detection result is determined to be an incorrect detection result. Then, a feature point belonging to the feature points 151 and 152 of the model pattern 150 is determined to be a notable feature point. The determined feature point corresponds to a feature point found at a high frequency in an input image in a correct detection result and found at a low frequency in the input image in an erroneous detection result. In this example, the feature point 152 of the model pattern 150 at the groove part is set as the notable feature point.

In this embodiment, in the presence of the set model pattern designation region 60, a correct detection result and an incorrect detection result can be distinguished more accurately. A region covering only the model pattern 150 may be extracted and used for detecting a target. This also makes it possible to distinguish a correct detection result and an incorrect detection result more accurately.

In the example described above, the target 100 shown in FIG. 1 is used as a detection target. The same method is applicable to the example shown in FIG. 2 for setting a feature point existing at the circle in the region 210 as a notable feature point. In the example shown in FIG. 2, the circle 201 can be selected accurately as a notable feature point by translating the straight line 200, for example.

Identification of a notable feature point has been described above. This notable feature point is incorporated into actual image detection process to detect the target 100 from an image. For example, after the model pattern designation region 60 is set in such a manner as to cover the model pattern 150, matching is performed in this region on the basis of the model pattern 150 to determine the position and the posture of the model pattern 150. Next, the position and the posture of the model pattern 150 can be determined precisely on the basis of the notable feature point. This is not the only method of using the notable feature point but the notable feature point is applicable to various types of processes for detecting targets.

The foregoing embodiment achieves the following effects. The image processing device 10 of this embodiment detects the target 100 from an input image 90 on the basis of the model pattern 150 as standard shape information defined by the multiple feature points 151 and 152. The image processing device 10 includes: the result acquisition unit 41 that acquires one or more of the input images 90 including the target 100, and acquires a detection result obtained by comparing the feature points 151 and 152 of the model pattern 150 with the input-side feature points 120 and 121 respectively extracted from the input image 90; the frequency calculation unit 42 that acquires multiple detection results in which the model pattern 150 and the target 100 are placed in different positions and different postures, and calculates frequencies of detection of the input-side feature points 120 and 121 in the input image 90 for corresponding ones of the feature points 151 and 152 of the model pattern 150; and the feature point selection unit 43 that selects a notable feature point from the feature points 151 and 152 of the model pattern 150 on the basis of the frequencies calculated by the frequency calculation unit 42.

Figure 2:
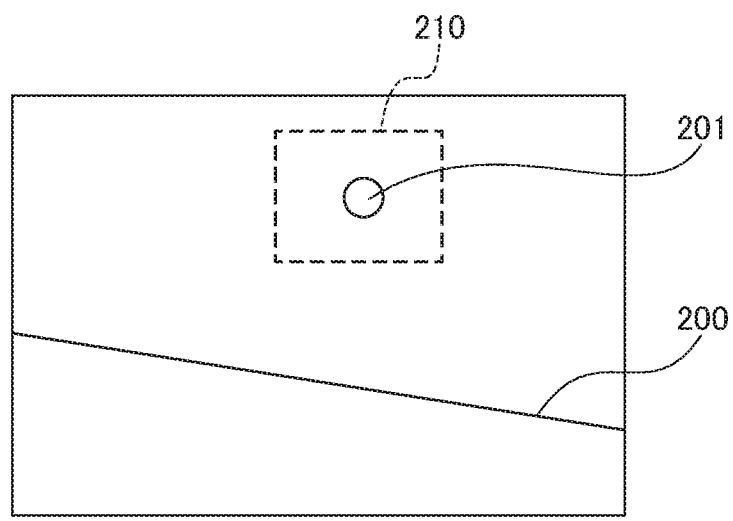
FIG. 2 is a schematic view showing an example where a target detected from an image has a shape with a straight line and a small circle.
Figure 3:
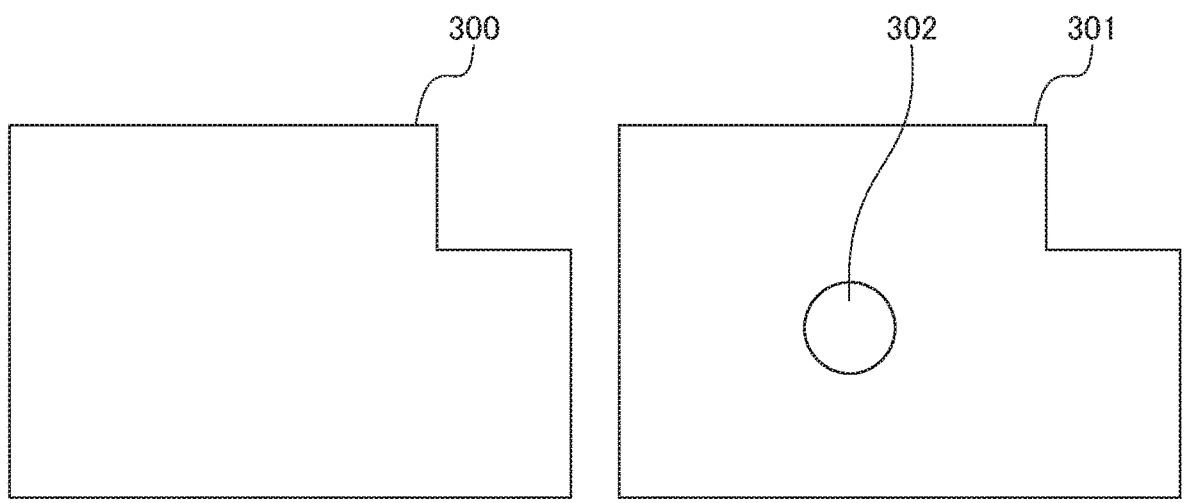
FIG. 3 is a schematic view showing an example where two types of targets are included in the same image.

As a result, the notable feature point can be selected even from a detection target of a shape shown in FIG. 1, 2, or 3, making it possible to detect the position and the posture of the target 100 stably. As the notable feature point is selected on the basis of the frequency, determination by a human is eliminated for determining whether a feature point is notable. By doing so, selection of a feature point not notable due to a careless mistake by a human, etc. can be prevented.

In this embodiment, the feature point selection unit 43 selects the feature point 152 from the feature points 151 and 152 of the model pattern 150 as a notable feature point. The selected feature point 152 corresponds to the input-side feature point 121 detected at a high frequency in a right detection result indicating that the target 100 has been detected correctly and detected at a low frequency in an erroneous detection result indicating that the target 100 has not been detected correctly.

As the results including the right detection result and the erroneous detection result are considered, the notable feature point can be selected with higher accuracy.

In this embodiment, the result acquisition unit 41 acquires a base image used as a basis for generating the model pattern 150 as the input image 90. The feature point selection unit 43 determines a detection result indicating detection of the target 100 in the same position and the same posture as in the base image to be the right detection result, and determines a detection result indicating detection of a different position and a different posture from those of the right detection result to be the erroneous detection result.

By doing so, the right detection result can be identified accurately and automatically using the position and the posture of the target 100 in the base image used as a basis for generating the clear model pattern 150, making it possible to select the notable feature point more accurately.

In the configuration described in the foregoing embodiment, a correct detection result and an incorrect detection result are distinguished automatically using the input image 90 used as a basis for generating the model pattern 150. However, this is not a limited configuration. According to a modification described next, a user determines whether a detection result is correct or incorrect.

Figure 14:
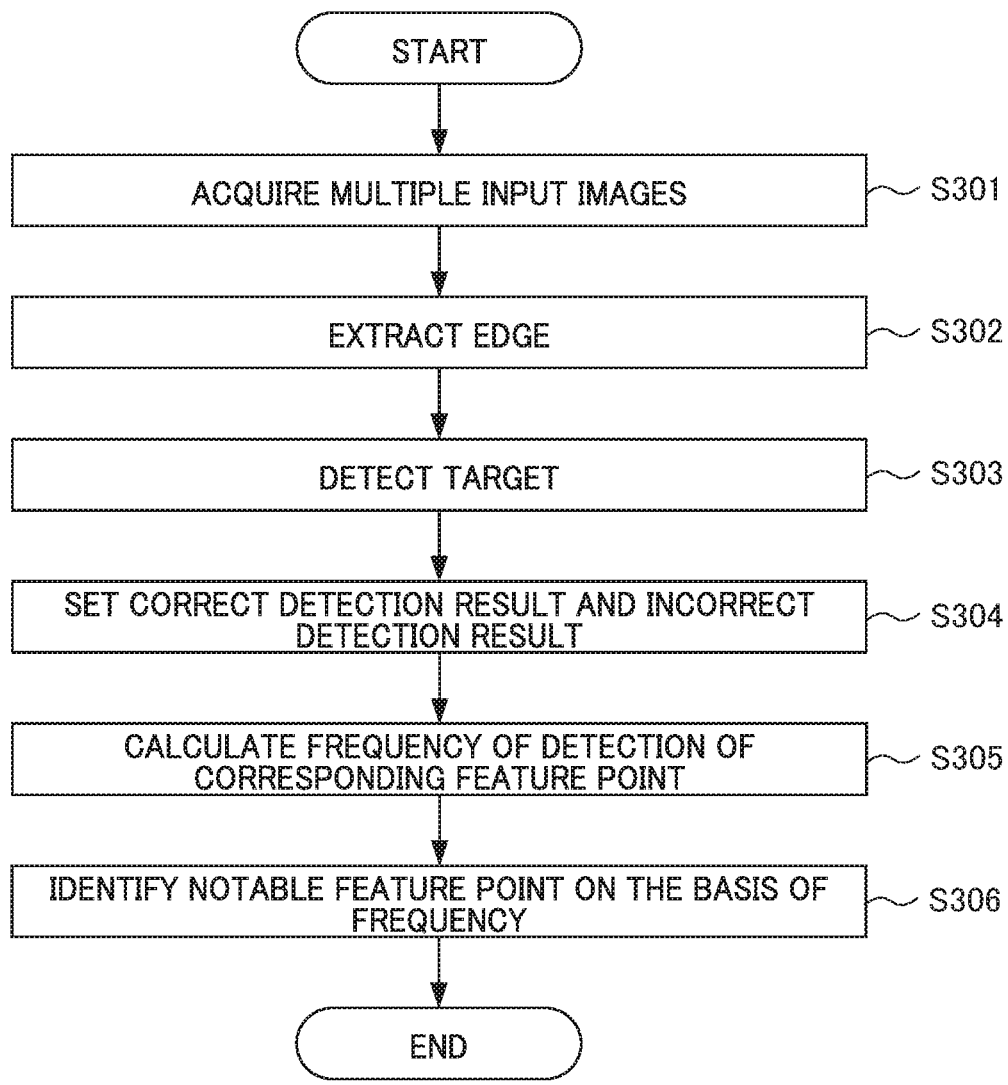
FIG. 14 is a flowchart showing a procedure of setting a notable range in a model pattern according to a modification.

FIG. 14 is a flowchart showing a procedure of setting a notable range in a model pattern according to the modification. A method described in this modification is to detect the target 301 distinctively from two types of targets including the first target 300 and the second target 301 shown in FIG. 3. As described above, the target 300 and the target 301 differ only in the presence of the circle 302 at the second target 301.

As shown in FIG. 14, an input image of the first target 300 and an input image of the second target 301 are acquired (step S301). Multiple input images illustrated in FIG. 14 mean the input image of the first target 300 and the input image of the second target 301.

Next, an edge of the first target 300 and an edge of the second target 301 are extracted. These edges are extracted in the same method as that described in the foregoing embodiment. Next, the target 301 is detected from the input image using a model pattern (step S303). The model pattern may be generated from the received input image or may be set in advance.

Next, a user operates the operator's panel 35 as a user interface and sets OK information at a detection result determined to be correct by the user. The user sets NG information at a detection result determined to be incorrect by the user (step S304). Namely, if the first target 300 is detected, a result indicating this detection is given the NG information. If the second target 301 is detected, a result indicating this detection is given the OK information. Next, the frequency calculation unit 42 calculates a frequency (step S305). On the basis of the calculated frequency, the feature point selection unit 43 selects a notable feature point (step S306).

As described above, according to this modification, the operator's panel 35 is further provided as a right/error setting unit that determines whether each of multiple detection results is a right detection result or an erroneous detection result.

As a result, even in the case of a shape such as that shown in FIG. 3, a notable feature point can be selected and the second target 301 can be detected accurately on the basis of the OK information and the NG information set by the user.

It should be noted that the present invention is not limited to the foregoing preferred embodiment and the modification of the present invention but can be changed, where appropriate.

In the foregoing embodiment, a method of generating a model pattern as standard shape information from an image captured by an image capture device has been described. However, the embodiment is not limited to this configuration. A model pattern can be generated by combining graphic objects such as a circle and a rectangle.

According to the present invention, an image (input image) is not limited to 2D image data but it includes 3D image data containing 3D shape information or 3D point group information. Thus, the present invention is further applicable to 3D data containing 3D shape information or 3D point group information in addition to 2D image data. In the following example, the present invention is applied to 3D data and a method of generating a model pattern on the basis of 3D CAD data will be described.

(1) First, a local coordinate system is defined in which an origin is set in an image capture surface of a camera.
(2) The camera is calibrated in advance. By doing so, a 3D point expressed in the local coordinate system can be converted to a 2D point in a camera image.
(3) Next, a target expressed as the CAD data is located virtually in the local coordinate system. The located CAD data is expressed in the local coordinate system. A correlation between the camera and the target is set to be substantially the same as a correlation therebetween for actually detecting a target.
(4) A group of 3D points on a contour located at predetermined intervals is acquired from the contour. If necessary, a contour in the CAD data to be used as a model pattern is designated.
(5) The 3D point group is projected on the camera image to acquire a 2D point group in an image coordinate system. A direction of brightness gradient can be added by designating a light-dark direction in the CAD data. The light-dark direction mentioned herein indicates which of two regions separated by the contour as a boundary is a lighter region.
(6) Then, the acquired 2D point group in the image coordinate system is converted so as to be expressed in a model coordinate system, and the resultant 2D point group is stored as a feature point into the model pattern storage unit.

The method of identifying a notable feature point described in the foregoing embodiment is also applicable to generation of a model pattern on the basis of 3D data. The notable feature point is identified on the basis of a detection result indicating a different position or posture.

EXPLANATION OF REFERENCE NUMERALS

10 Image processing device
41 Result acquisition unit
42 Frequency calculation unit
43 Feature point selection unit
90 Input image
100 Target
120, 121 Input-side feature point
150 Model pattern (standard shape information)
151, 152 Feature point

What is claimed is:

1. An image processing device that detects a target from an input image on the basis of standard shape information defined by multiple feature points, comprising:
    a result acquisition unit that acquires the one or more of the input images including the target, and acquires a detection result obtained by comparing the feature points of the standard shape information with input-side feature points extracted from the input image;
    a frequency calculation unit that acquires multiple detection results in which the standard shape information and the target are placed in different positions and different postures, and calculates frequencies of detection of the input-side feature points in the input image for corresponding ones of the feature points of the standard shape information; and
    a feature point selection unit that selects a feature point as a notable feature point from the feature points of the standard shape information on the basis of the frequencies calculated by the frequency calculation unit.

2. The image processing device according to claim 1, wherein
    the feature point selection unit selects the feature point from the feature points of the standard shape information as the notable feature point,
    the selected feature point corresponding to one of the input-side feature points detected at a high frequency in a right detection result indicating that the target has been detected correctly,
    the one input-side feature point being detected at a low frequency in an erroneous detection result indicating that the target has not been detected correctly.

3. The image processing device according to claim 2, wherein the result acquisition unit acquires a base image used as a basis for generating the standard shape information as the input image, and
    the feature point selection unit determines a detection result indicating detection of the target in the same position and the same posture as in the base image to be the right detection result, and determines a detection result indicating detection of a different position and a different posture from those of the right detection result to be the erroneous detection result.

4. The image processing device according to claim 2, further comprising a right/error setting unit that determines whether each of the detection results is the right detection result or the erroneous detection result.

* * * * *